(12) United States Patent
Wang et al.

(10) Patent No.: US 6,538,997 B1
(45) Date of Patent: Mar. 25, 2003

(54) LAYER-2 TRACE METHOD AND NODE

(75) Inventors: Peter Si-Sheng Wang, Cupertino, CA (US); Anthony Ballardie, Alstonefield (GB)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/103,789

(22) Filed: Jun. 24, 1998

(51) Int. Cl.[7] .............................................. G01R 31/08
(52) U.S. Cl. ........................ 370/241; 370/248; 370/256
(58) Field of Search ................................ 370/242, 243, 370/244, 245, 248, 249, 250, 252, 254, 255, 256, 395.53

(56) References Cited

U.S. PATENT DOCUMENTS

| | | | | |
|---|---|---|---|---|
| 4,993,015 A | * | 2/1991 | Fite, Jr. ...................... | 370/218 |
| 5,502,712 A | * | 3/1996 | Akita .......................... | 370/225 |
| 5,825,751 A | * | 10/1998 | Papierniak et al. ......... | 370/248 |
| 5,920,705 A | * | 7/1999 | Lyon et al. ................. | 709/240 |
| 5,926,463 A | * | 7/1999 | Ahearn et al. .............. | 370/254 |

OTHER PUBLICATIONS

"Information Technology–Telecommunications And Information Exchange Between Systems–Local And Metropolitan Area Networks–Specific Requirements–Part 2: Logical Link Control", ANSI/IEEE Standard 802.2, Dec. 30, 1994, pp. i–159.

Postel et al., "A Standard For The Transmission Of IP Datagrams Over IEEE 802 Networks", Network Working Group, RFC 1042, Feb. 1988, pp. 1–15.

* cited by examiner

*Primary Examiner*—Hassan Kizou
*Assistant Examiner*—Ahmed Elallam
(74) *Attorney, Agent, or Firm*—McDonnell Boehnen Hulbert & Berghoff (57) ABSTRACT

Method of troubleshooting a path that includes a source node, a set of destination nodes, and a set of at least an intermediate node in a computer network. The source node sends a packet to an intermediate node in the set of at least an intermediate node. At least a layer-2 intermediate node in the set of at least an intermediate node inserts data into the packet, and the layer-2 intermediate node sends the packet to another node in the path. A packet for troubleshooting a path in a computer network is disclosed. The path includes a source node, a destination node, and a set of at least one intermediate node. The packet comprises an address that corresponds to the destination node and data inserted by layer-2 intermediate nodes through which the packet has traversed. A method of troubleshooting a path that includes a set of layer-2 devices and a set of layer-3 devices is disclosed. A node in a computer network is disclosed. The node is in a path that includes a source node and a destination node. The node includes layer-2 logic that receives a packet, and, if the packet includes an indicator that a trace is to be performed, inserts data into the packet and sends the packet to another node in the path.

59 Claims, 6 Drawing Sheets

| | |
|---|---|
| Protocol Identifier | 2 octets |
| Protocol Version | 1 |
| Flags | 1 |
| BPDU Type | 1 |
| Group MAC address | 6 |
| Source MAC address | 6 |
| Dest'n MAC address | 6 |
| Response MAC address | 6 |
| Trace Identifier | 2 |
| Scope | 1 |

*Fig. 6a*

| | |
|---|---|
| Response Segment Length | 2 |
| Flags | 1 |
| Query Arrival Time | 4 |
| Incoming Port (I/P) | 6 |
| Outgoing Port (O/P) | 6 |
| I/P Frame count | 4 |
| O/P Frame count | 4 |
| Error Code | 1 |
| Option Type | 1 (if present) |
| Option Length | 1 (if present) |
| Option Value | variable (if present) |

*Fig. 6b*

LAYER-2 TRACE METHOD AND NODE

BACKGROUND OF THE INVENTION

1. Field of the Invention

This invention relates to diagnostics for computer networks; in particular to diagnostics for identifying problems in layer-2.

2. Description of Related Art

Computer networks are increasingly complex combinations of components. End stations, bridges, routers, and various other devices are combined in order to achieve the desired functionality. As complexity has increased, so has the difficulty in isolating problems in the network. Packets of data transmitted within networks may follow paths that are not readily ascertainable. When a problem occurs in the transmission of packets within the network occurs, it may then be difficult to determine the cause of the problem.

Network managers may use a facility known as a trace in order to help troubleshoot a problem in a computer network. One such trace is known as an "mtrace." Typically, the network manager causes the mtrace to start at the destination of the path that is desired to be diagnosed. When the trace is received by the other end of the path, the node receiving the trace responds. Such a trace typically operates at layer 3 of the computer network.

With the increasing complexity of computer networks, isolating faults in the computer network becomes more important. Therefore, it is desirable to obtain improved methods and equipment for isolating faults and troubleshooting in computer networks.

SUMMARY

The invention is directed to a method of troubleshooting a path that includes a source node, a set of destination nodes, and a set of at least an intermediate node in a computer network. The source node sends a packet to an intermediate node in the set of at least an intermediate node. At least a layer-2 intermediate node in the set of at least an intermediate node inserts data into the packet, and the layer-2 intermediate node sends the packet to another node according to information on the intermediate node regarding the path.

According to an aspect of the invention, data includes an identifier of the layer-2 intermediate node. The data may include a medium access control (MAC) address of the layer-2 intermediate node. The data may also include a number corresponding to a time at which the packet traversed through the layer-2 intermediate node.

According to another aspect of the invention, the packet has a layer-2 payload that includes an address corresponding to a node in the set of destination nodes. According to another aspect of the invention, the address corresponding to a node in the set of destination nodes includes a logical link control address assigned to a bridge spanning tree protocol. The address corresponding to a node in the set of destination nodes includes a MAC address, according to another aspect of the invention. The MAC address may include a unicast address or, according to another aspect of the invention, a multicast address.

According to another aspect of the invention, intermediate nodes in the set of at least an intermediate node send the packet to respective intermediate nodes or a node in the set of destination nodes according to a spanning tree algorithm.

According to another aspect of the invention, at least a node from among a node in the set of destination nodes and nodes in the set of at least an intermediate node sends a second message to a network management station, and the second message includes at least a portion of the data.

An embodiment of the invention includes a packet for troubleshooting a path in a computer network. The path includes a source node, a destination node, and a set of at least one intermediate node. The packet comprises an address that corresponds to the destination node and data inserted by layer-2 intermediate nodes through which the packet has traversed.

An embodiment of the invention includes method of troubleshooting a path that includes a set of layer-2 devices and a set of layer-3 devices. A first trace is initiated to cause at least a layer-3 device in the set of layer-3 devices to insert data into a first packet. Based on the first trace, a second trace is initiated to cause at least a layer-2 device in the set of layer-2 devices to insert data into a second packet.

An embodiment of the invention includes a node in a computer network. The node is in a path that includes a source node and a destination node. The node includes layer-2 logic that receives a packet, and, if the packet includes an indicator that a trace is to be performed, inserts data into the packet and sends the packet to another node in the path.

DETAILED DESCRIPTION

A detailed description of embodiments of the invention is provided with reference to the figures. An embodiment of the invention includes a method of performing a trace of a multicast path at layer-2. A trace request packet is sent to the source node in the path. The source node and respective intermediate nodes send the layer-2 trace packet to nodes along the path according to information on the respective nodes regarding the path. Nodes insert data into the packet before forwarding the packet along the path. When the packet is received at a destination node, a response is sent to another node, such as a network management node. The response is then available to be inspected to help troubleshoot the path. Data added to the packet by a node may include information about the node such as an identifier of the node, time the packet passed through the node, inbound/outbound parts, MTU of the path, or other data. Information on the respective nodes regarding the path may be incorrect. If such information is incorrect, the trace may help identify that incorrect information. In another embodiment of the invention, a layer-2 packet is used to trace a unicast path.

Figure 1:
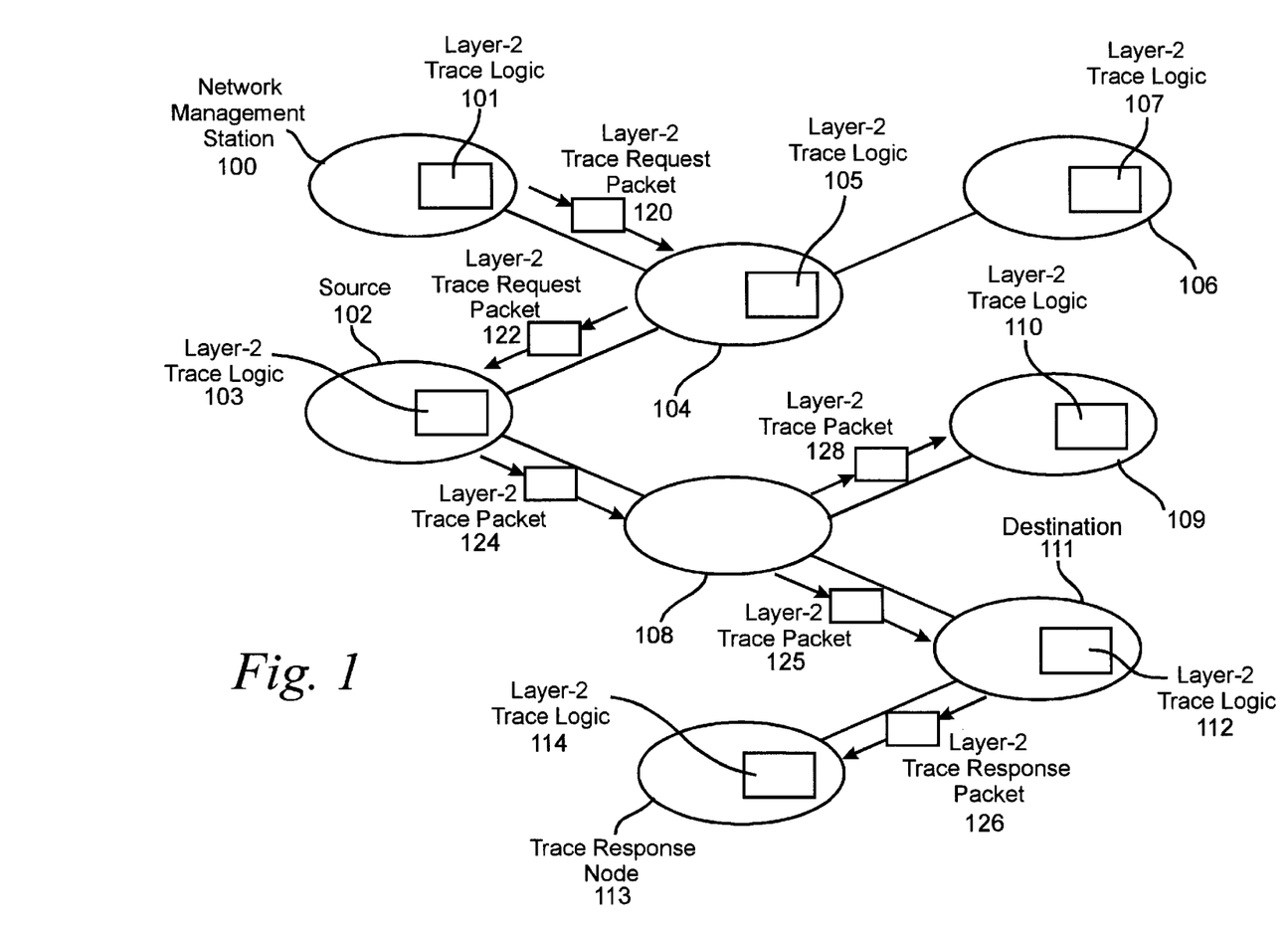
FIG. 1 shows a schematic of a network with a layer-2 trace of a unicast path.

FIG. 1 shows a schematic of a network with a layer-2 trace of a unicast path. FIG. 1 includes a network management station 100 and a number of layer-2 nodes, including source node 102, node 104, destination node 106, node 108, node 109 and destination node 111. Trace response node 113 may be a layer-2 node also. A trace request is sent from a node to one of the nodes within the network. The trace request propagates to the source node from which the trace is to be started. As shown here, network management station 100 initiates a trace with trace request packet 120, which propagates through node 104, and trace request packet 122 is forwarded to source node 102. Initial request and final report packets are forwarded as unicast packets according to normal LAN procedures. Layer-2 trace logic 103 within source node 102 initiates the trace by sending layer-2 trace packet 124 to node 108. As shown here, the trace is tracing a unicast path. Nodes along the path insert data into the packet that identify themselves and also add other information for the purpose of diagnosis of the path. As shown here, node 108 does not have layer-2 trace logic. Therefore node 108 forwards layer-2 trace packet as trace packet 125 without adding trace data to the packet. However, if node 108 were to include layer-2 trace logic, then this logic would insert data into layer-2 trace packet 124, which could then be used later for the purposes of diagnostics. Layer-2 trace packet 125 is received by destination node 111 and 109. Layer-2 trace logic 112 within destination node 111 then forwards a response packet, layer-2 trace response packet 126 to a node designated in the trace packet. Node 108 forwards packet 128 to node 109 without acting upon it. Node 108 forwards packet 128 because node 109 does not include layer-2 trace logic that would cause node 109 to forward the packet only to destination 111. Node 109 discards trace packet 128 because node 109 is not a destination of the trace. Destination node 111 forwards a layer-2 trace response packet 126 to trace response node 113. This response packet 126 includes information regarding the path that was taken by the respective trace packets 124 and 125 including, to the extent that nodes along the way implemented layer-2 trace logic, the nodes through which the trace packets have passed and other information, such as the time that the packet passed through respective nodes and ports through which the trace packet passed.

The information received from the trace response packet 126 can then be used to troubleshoot errors in the path between source node 102 and destination node 111. Other combinations of paths are possible as well as other network configurations and response nodes. For example, multiple nodes may be present in the path between source node 102 and destination node 111, and these various nodes insert their respective identifiers into the trace packets and forward those packets along the path. A trace response node may be a node outside of the network or it may include the destination node 111. As shown in FIG. 1, the trace request starts from the network management station 110; however, the trace request may also be initiated directly from the source node 102. The trace is performed at layer-2. The trace packet has a layer-2 protocol header and no layer-3 header. The data for the trace is included directly behind the layer-2 protocol header. The trace packet is addressed directly to the next bridge in the path. A special MAC address is used to address the packet to the next bridge in the path. This MAC address is interpreted as a sink so that the respective bridges in the path do not merely automatically forward the packet. The MAC address causes the respective bridges to act upon the packet rather than simply forwarding it. The bridges that have layer-2 trace logic look at the contents of the packet and determine the actions that they should take upon the packet. For example, the bridges will add their respective identifiers, such as their respective MAC addresses, or other internal identifiers.

Figure 2:
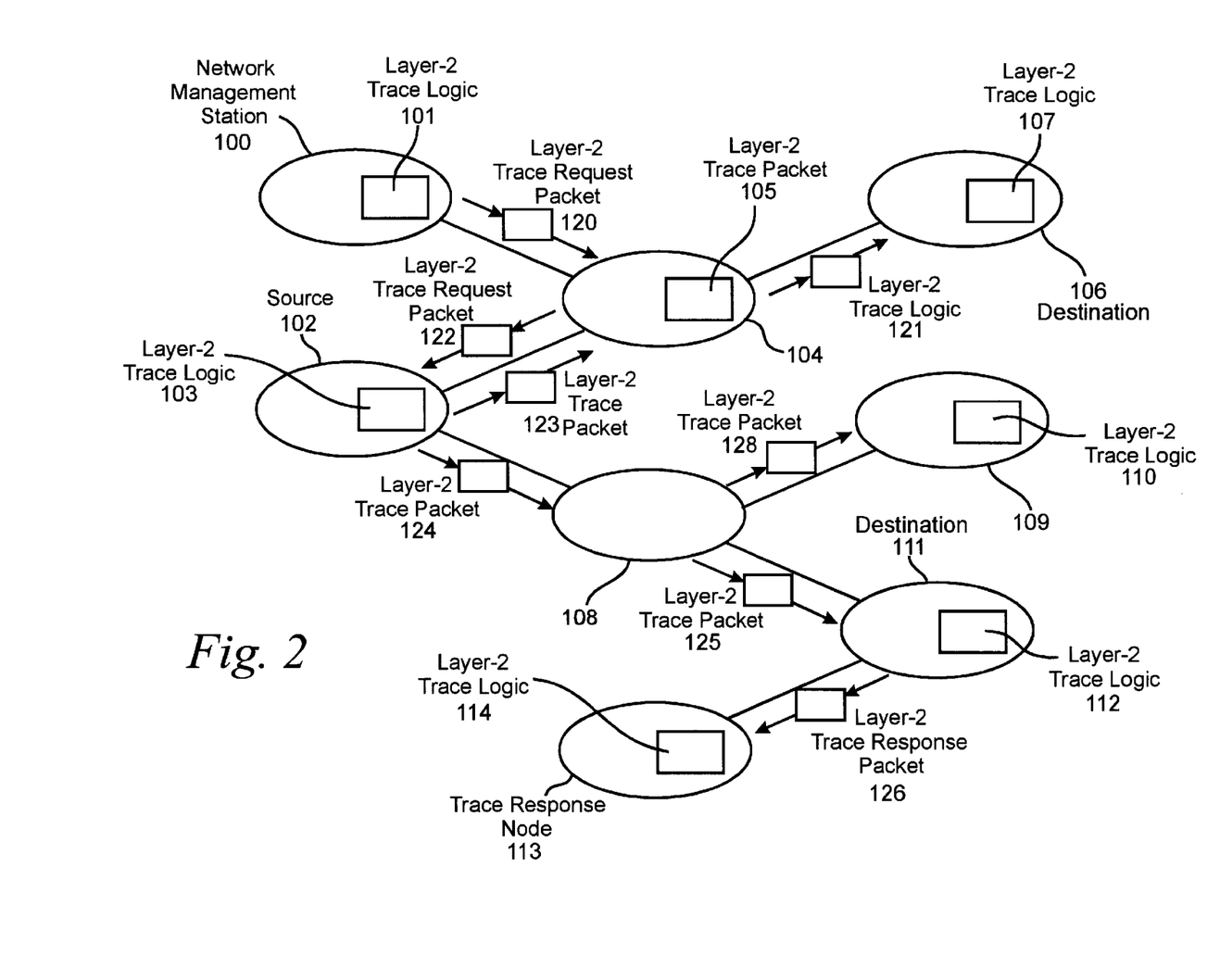
FIG. 2 shows a schematic of a network with a layer-2 trace of a multicast path.

FIG. 2 shows a schematic of a network with a layer-2 trace of a multicast path. The multicast path includes source node 102, node 104, destination node 106, node 108 (an intermediate node), node 109, and destination node 111. The trace is initiated by network management station 100 in layer-2 trace logic 101. Network management station 100 sends the layer-2 trace request packet 120 to node 104. The packet is forwarded unchanged as layer-2 trace request packet 122 from node 104 to source node 102. Layer-2 trace logic 103 causes trace packets to be sent along the multicast path. For example, layer-2 trace packet 123 is sent to node 104 and layer-2 trace packet 124 is sent to node 108. Layer-2 trace logic 105 receives the packet 123 and acts upon it by adding data to the packet and forwarding it as layer-2 trace packet 121. The data added to the packet includes an identifier of node 104 such as a MAC address of node 104 or an ASCII identifier of node 104. The data may include other information such as the time that the packet entered the node, a port on the node 104 at which trace packet 123 was received, the port on node 104 from which layer-2 trace packet 121 was transmitted. The packet is forwarded with this data as layer-2 trace packet 121, which is sent to destination node 106. Respective destination nodes in the path, node 106, and node 111 transmit layer-2 response packets to a trace response node 113. Layer-2 trace packet 124 is forwarded through node 108, which does not include layer-2 trace logic. Since node 108 does not have layer-2 trace logic, node 108 forwards layer-2 trace packet 124 as layer-2 trace packet 125 without acting upon it. Destination node 106 receives layer-2 trace packet 121, layer-2 trace logic 107 causes a layer-2 trace response packet to be sent to trace response node 113, but this response packet is not shown in the figure. Likewise, when destination node 111 receives layer-2 trace packet 125, layer-2 trace logic 112 causes layer-2 trace response 126 to be sent to trace response node 113. Layer-2 trace logic 114 within trace response node 113 may process the layer-2 trace response packet or store it for later analysis. Node 108 forwards packet 128 to node 109 without acting upon it. Node 108 forwards packet 128 because node 109 does not include layer-2 trace logic that would cause node 109 to forward the packet only to destination 111. Node 109 discards trace packet 128 because node 109 is not a destination of the trace.

Other configurations of the network and paths followed by trace packets are possible. Further, response packets may be sent from nodes other than destination nodes. For example, first a trace may be requested in which destination nodes only send response packets to a trace response node. Then, if responses are not received from destination nodes, another trace request may be made which causes intermediate nodes to send trace response packets to a trace response node. Some or all of the intermediate nodes may be requested to send such trace response packets to a trace response node. Although the multicast path displayed shows two branches, multiple branches may be included in a multicast path that is diagnosed by the layer-2 trace. The trace method shown is backwards compatible with old systems that do not implement the trace logic. This is because intermediate nodes that do not have the trace logic forward the packet, as shown with node 108.

Figure 3:
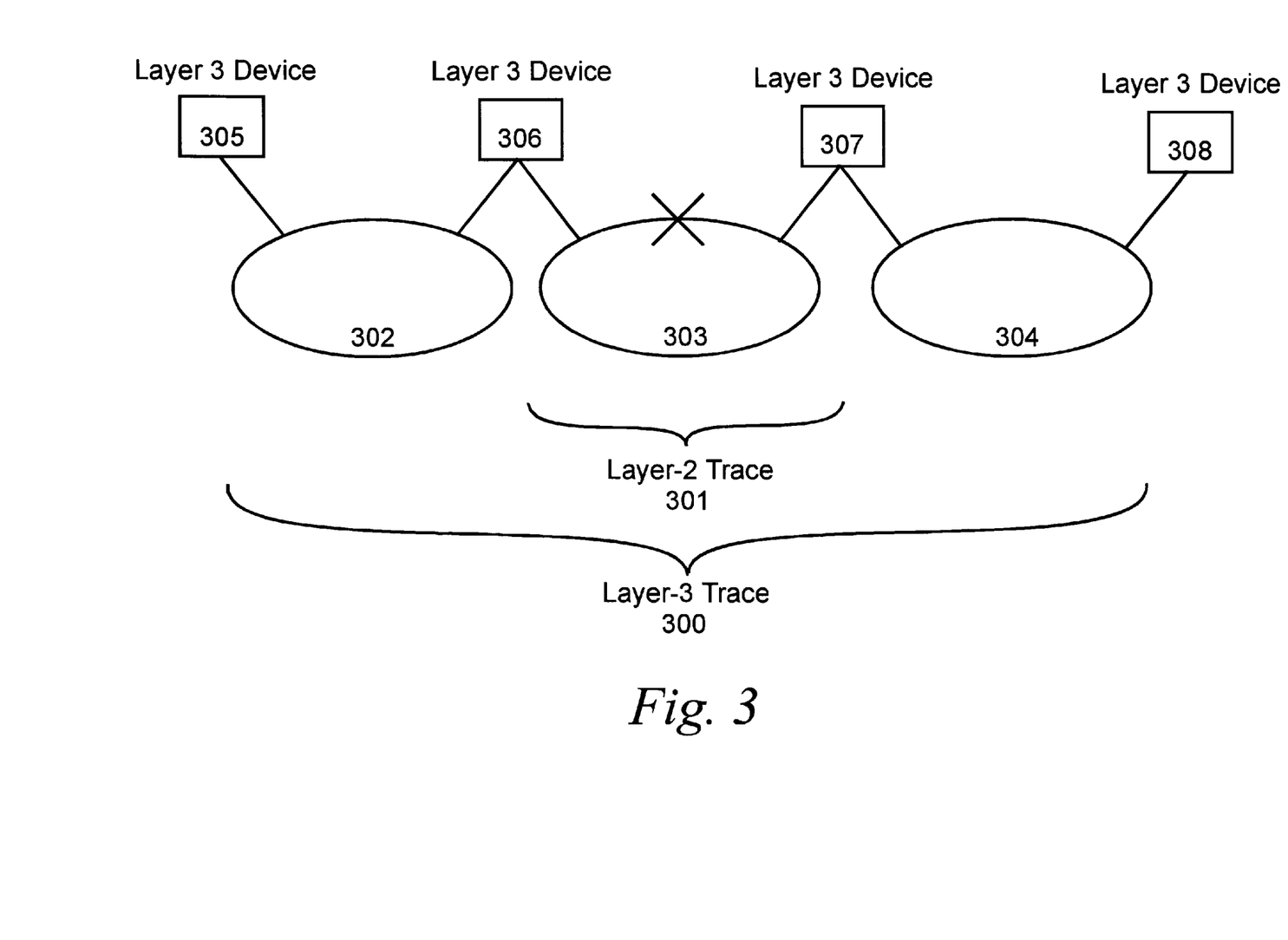
FIG. 3 shows a schematic of a network with a layer-3 trace and a layer-2 trace.

FIG. 3 shows a schematic of a network with a layer-3 trace and a layer-2 trace. FIG. 3 shows a series of layer-2 networks coupled by layer-3 devices into a layer-3 network. For example, layer-2 network 302 and layer-2 network 303 are coupled by layer-3 device 306, and layer-2 network 303 and 304 are coupled by layer-3 device 307. Network 302 is also coupled to layer-3 device 305, and network 304 is also coupled to layer-3 device 308.

A layer-3 trace 300 is implemented between layer-3 device 305 and layer-3 device 308. This layer-3 trace 300 identifies a fault in network 303. Then, a layer-2 trace 301 is used to further pinpoint the cause of the fault within network 303. The layer-2 and layer-3 trace may be used in conjunction with each other by first attempting a layer-3 trace and then attempting a layer-2 trace if a fault is determined to reside in a particular layer-2 network.

The layer-2 trace is implemented by hosts, bridges/switches, and routers. A router can function as a host or a bridge/switch. The layer-2 trace can be used for both unicast and multicast purposes.

The layer-2 trace may be used for some of the following purposes:
  to trace a layer-2 path (both unicast or multicast) between a sender and receiver
  to isolate frame loss problems
  to isolate or receive switch configuration information Additionally, the layer-2 trace can be used to discover the Path MTU of the extended LAN from the perspective of a node within the LAN. This information can be used to optimize link efficiency and utilization in communication sessions between the receiver (destination) and source (unicast or multicast).

Another potential use for the layer-2-trace is the identification of VLANs (ports, VLAN identifiers, etc.) within the extended LAN.

A network administrator enters the following command line to start a layer-2 trace:
  12-trace [flags] <arg1><arg2>[<arg3>] [<arg4>] [<arg5>]
  These arguments are as follows:
  flags: optional.
  <arg1>: this is the intended source of the trace (which is not necessarily the node at which the trace is invoked), and is specified either as an IP unicast address or a 6-octet unicast MAC address. If the intended source of the trace is the local node, the word local can be used. If the local node has multiple MAC addresses (multi-homed), specifying local will result in the first one listed in the systems network interface data structure being used as the intended source of the trace.
  <arg2>: this is the intended destination of the trace, and is specified either as an IP unicast address, a 6-octet unicast MAC address, or the wildcard symbol (*)

A trace using a non-wildcarded <arg2> in conjunction with <arg3> (optional) results in a trace of the path between the specified source <arg1> and destination <arg2> over the multicast distribution tree specified by <arg3>.

Using a wildcarded (*) <arg2> in conjunction with <arg3> (optional) results in a trace between the specified source <arg1> over the complete multicast distribution tree identified by <arg3>. This usage scenario could be used for mapping a multicast group's layer-2 tree.

If the wildcard symbol (*) is used and <arg3> is omitted, the trace becomes one of the complete (or within the scope specified by <arg4>, optional) active spanning tree from the perspective of the specified source <arg1>.
  <arg3>: an optional argument specifying either an IP multicast address, or a 6-octet multicast MAC address.
  A trace using <arg3> in conjunction with a non-wildcarded <arg2> results in a trace of the specific path between the specified source <arg1> and destination <arg2> over the multicast distribution tree specified by <arg3>.
  A trace using <arg3> in conjunction with a wildcarded <arg2> (*) results in a trace of the complete multicast distribution tree specified by <arg3>.
  <arg4>: an optional argument specifying a positive integer between 1 and 255. This value is the maximum number of switch hops that the trace may traverse before the trace response must be returned to the "response" node as optionally specified by <arg5>. If omitted, <arg4> defaults to 255.
  <arg5>: an optional argument for specifying the node (or group of nodes) to which the trace response is to be sent, if other than that specified by <arg1>—the default response node. <arg5> is specified either as an IP unicast or multicast address, or a unicast or multicast MAC address.

The use of a multicast response address enables a response to be received by a group of nodes.

As an alternative to a command line interface as described above, other user interfaces may be used, for example, a graphical user interface may be used.

The layer-2 trace can be used by hosts and/or switches and/or routers in a number of ways—to gather general information relating to the switched network, or to gather specific diagnostic information relating to a particular path through the switched network.

An example of its general usage might be for the purpose of learning about bridge/switch configuration information, or the minimum MTU of the extended LAN. A more specific use might be to diagnose a particular path through the switched network subsequent to experiencing communication problems with a particular destination (unicast or multicast).

Using IP addresses on the command line helps to provide convenience for the network administrator. An IP addresses input on the command line will be resolved to the corresponding MAC address before layer-2 trace proceeds. This may require the sending of ARP requests if the corresponding address mappings are not present in the node's ARP cache. However, if the path being traced is between a device that may not have an IP address (for example, some switches may not have an IP address), then the corresponding MAC address is used on the command line.

The path taken within the LAN between external (to the extended LAN) sources and/or receivers can be traced using a "proxy" source (destination) address on the command line. The "proxy" is a node located at the extended LAN boundary within the LAN. Knowledge of the ingress (egress) point where a unicast or multicast frame enters (leaves) the switched network is used, e.g. a particular router. In this case, an address (MAC or IP) of the router can be used on the command line. In the absence of other tools or information, one layer-2-mtrace per candidate egress router in this case is used.

Besides the advantage of being able to diagnose a unicast path, when used in the multicast context, another advantage layer-2-trace has is that, because the layer-2 multicast tree is a subset of the active spanning tree topology, the multicast path traced between a sender and group receiver will be the same as the unicast path between the sender and the receiver. Furthermore, the path is symmetric. Prior trace systems in contrast are constrained to tracing the path from receiver to source because the source has no idea via which multicast tree branch the receiver is reachable. A layer-2 multicast trace is not similarly constrained since bridges/switches know over which port a particular (unicast) MAC address is reachable. If they do not, the frame is "flooded" over all outgoing non-blocked ports. This advantage is as a consequence of the layer-2 unicast and multicast topologies being aligned.

The layer-2-trace traces the path from source to receiver (destination). The reason for this is that mechanisms used for discovering multicast group filter state ("snooping", GARP, CGNP) install the filter state on the switch port that is closest to the registering receiver. Therefore, a trace in the direction receiver to sender, would not succeed in finding the sender if the sender is not a registered group member (or a group member has registered on the same segment as the sender).

In alternative embodiments, additional information may be added to the layer-2-trace. For example, permanent unicast and multicast database forwarding and filtering entries may be added. Also spanning tree parameters may be added.

Layer-2-trace frames may be constrained by the Path MTU of the switched network—no segmentation/reassembly function typically exists in conventional bridged networks. The MTU may typically be at least 1500 octets.

In an embodiment of the invention, where there is an MTU constraint, the scalability of the layer-2-trace is dependent on the size of the response data segments of the trace frame. The more information that is contained within the response data segments, the less that the protocol is scalable. If the layer-2-trace contains information corresponding to the mtrace in response frames, thus requiring approximately 24 octets of layer-2 information, and assuming the LAN MTU is 1500 octets, then the diameter of the extended LAN could be 62 switch hops.

The layer-2-trace includes an embodiment that is backwards compatible with existing LAN equipment that has not implemented the protocol. Under such an embodiment, bridges/switches forward unrecognized frames such as the layer-2-trace frame in compliance with the IEEE 802.1D specification.

End stations (hosts) are not forwarding devices, and are therefore expected to discard unrecognized frames.

The default behavior of forwarding unrecognized frames by IEEE 802.1D bridges is compatible with layer-2 trace's goal of being transparent to equipment which has not implemented layer-2 trace, making it independently deployable. Non-conforming intermediate devices between a particular source and destination then forward a layer-2 trace frame without modifying it (without appending a response segment).

As a result of a destination being a host which has not implemented layer-2 trace, the trace requester may never hear a response to its trace request. If, after several retries, no response is forthcoming, layer-2 trace is set into a mode of operation (using a command line flag) which may be called a ripple search, whereby each bridge/switch/router visited returns its own response segment before forwarding the trace request. Thus, during a ripple search, each trace response contains just a single response segment. In an alternative embodiment, the expanding ring search is used in such a situation.

Figure 4:
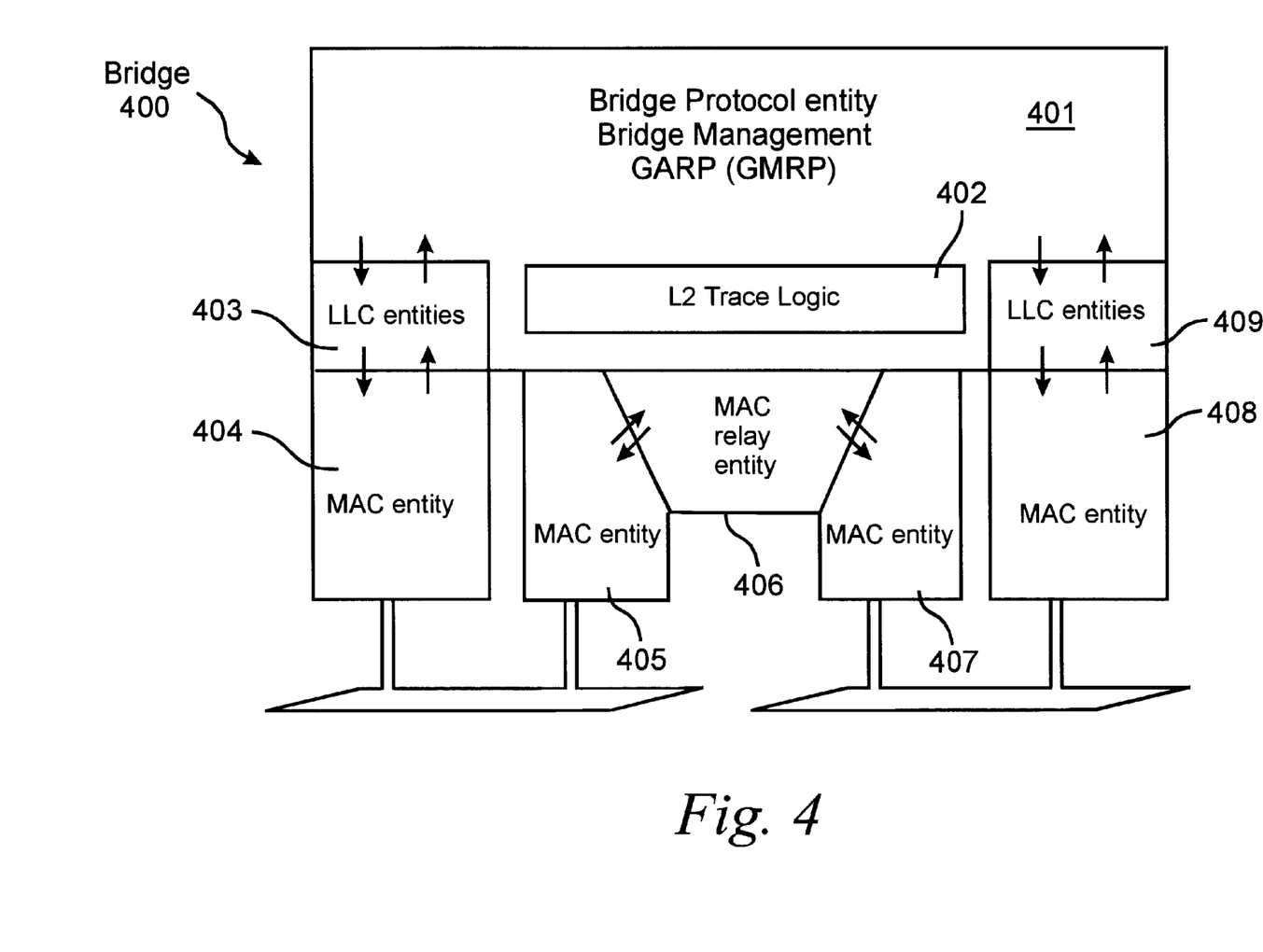
FIG. 4 shows a logical structure of a bridge that includes layer-2 trace logic.

FIG. 4 shows a logical structure of a bridge 400 that includes layer-2 trace logic. The layer-2 trace logic 402 is part of Bridge Management 401. Bridge 400 includes LLC entities 403 and 409, MAC entities 404, 405, 407 and 408, and MAC relay entity 406. Bridge Management 401 sits directly above the LLC sublayer, but below the network layer (Layer 3). If packaged as part of Bridge Management, layer-2 trace could adopt the corresponding LLC value, then only requiring its own Protocol Identifier.

The first step of the protocol involves a trace request being sent from an end-station (e.g. a management end-station) to the source specified on the command line. This is the source discovery phase. The first hop discovery flag is set in the trace request, which is unicast to the specified source node. This flag is unset when the trace request reaches the specified source node.

On reaching the source node, the protocol enters the trace phase. In the trace phase trace requests are always MAC addressed to a group address, a predetermined layer-2 group address. In many cases, the multicast tree defined by the group will correspond to the active spanning tree. Layer-2 trace multicast frames are not necessarily sent over all of a node's outgoing ports defining the layer-2 trace tree—this depends on the specific nature of each individual trace.

A host discards a layer-2 trace request frame unless it is either the source or destination specified in the layer-2 trace request header. If a host is the specified trace source, an arriving layer-2 trace request frame will have been explicitly (MAC) addressed to it—the trace phase begins at this host. If a host is the specified trace destination, the arriving trace request frame, with its included response segments, is converted to a trace response frame and returned to the designated response address, as specified in the trace request/response header.

Figure 5A:
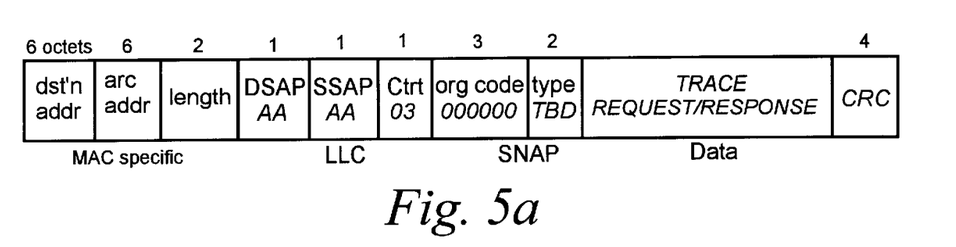
FIGS. 5a and 5b illustrate a trace request and response sent over an Ethernet segment.
Figure 5B:
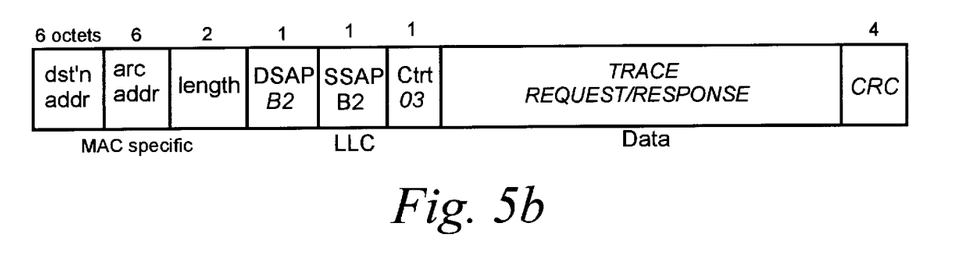

Trace request/responses are encapsulated in a frame format specific to the LAN technology of the outgoing segment. FIGS. 5a and 5b illustrate a trace request/response sent over an Ethernet segment. Two different formats are shown: the first is IEEE 802.2/802.3 with SNAP encapsulation (RFC 1042), and the second is IEEE 802.2/802.3 without SNAP encapsulation.

The layer-2 trace uses the Standard LLC address assigned to the Bridge Spanning Tree Protocol (decimal 130, Hex. 82).

Figure 5C:
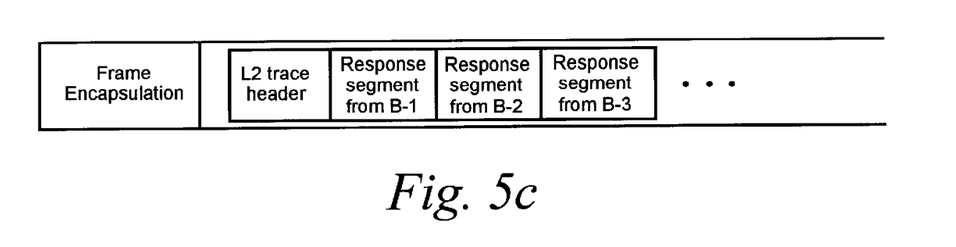
FIG. 5c shows a response data segment inserted into a trace request.

Each switch visited by a trace request (with the "trace phase" flag set) inserts a "response data" segment into the request (FIG. 5c), thereby including the requested information, and forwards the request appropriately, towards the specified destination.

A multicast trace is distinguished from a unicast trace by the inclusion of the optional group address parameter on the command line. If <arg2>—the trace destination—is wildcarded (*), denoting a multicast tree trace, the absence of a multicast forwarding cache entry for the specified group in a switch results in the trace terminating at that point. If a multicast trace is requested between two points on a multicast tree (non-wildcarded), the trace request is either forwarded over a specific port leading to the specified destination (if that port is known), or forwarded over all outgoing ports of the multicast distribution tree.

If a switch cannot provide the requested information, it may or may not forward the request. In some instances this may lead to an error response which implies the termination of the trace at this point, and the return of the error response to the trace requestor. An error response is indicated by the appropriate error code in the response data segment, and a flag in the trace header.

In the absence of errors, the trace request frame is processed switch hop by switch hop. When the trace request reaches the trace destination (as specified in the trace request/response header), this node modifies the "BPDU Type" from 1 (trace request) to 2 (trace response) and returns the trace response to the designated response node (as specified in the trace request/response header). The response may be unicast, multicast, or broadcast, as appropriate.

Whenever a response frame (successful, or error response) is returned to the designated trace response address, this is known as the response phase of the protocol.

Figure 6A:
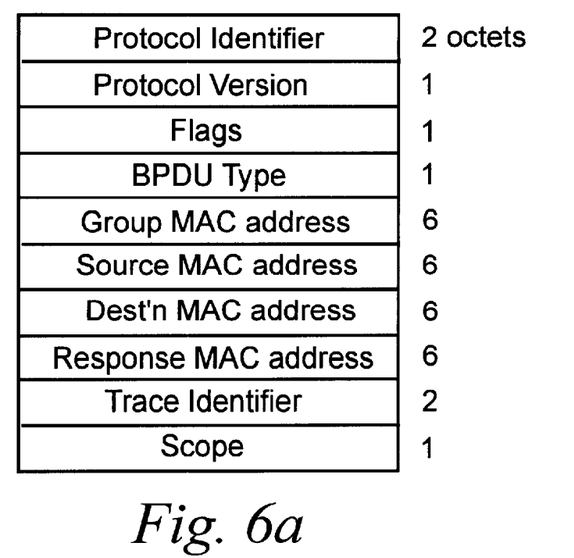
FIG. 6a shows the BPDU format in a trace request and response header.

FIG. 6a shows the BPDU format in a trace request and response header.

Field definitions:

Protocol Identifier: uniquely identifies layer-2 trace

Protocol Version: layer-2 trace version number

Figure 6B:
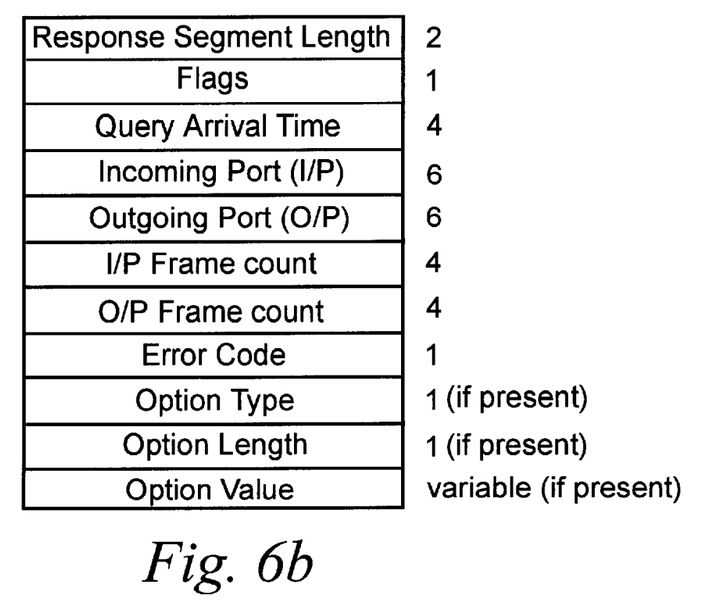
FIG. 6b shows response data for a layer-2 trace.

Flags for:

path MTU discovery active
abort trace if no forwarding cache entry for "Destination MAC Address"
if unicast trace and no forwarding entry for "destination," flood trace request
abort multicast trace if no forwarding cache entry for "group MAC address"
if multicast trace and no multicast forwarding entry for "group," flood trace request over multicast tree
error response BPDU type:
1. =Layer-2 trace Request
2. =Layer-2 trace Response
Group MAC Address: multicast address of group being traced, or 0 (zero) for unicast trace
Source MAC Address: source address of the trace
Destination MAC Address: destination (receiver) of the trace
Response MAC Address: trace requester
Trace Identifier: uniquely identifies a trace
Scope: set by trace requestor to maximum number of switch hops to trace, decremented by each processing switch in the trace phase of the protocol. When "Scope" reaches 0 (zero), trace terminates and an appropriate error response is returned to the trace requester.
FIG. 6b shows response data for a layer-2 trace.
Field definitions:
Response Segment Length: length (octets) of response segment (1 response segment per bridge/switch)
Flags
Query Arrival Time
Incoming Port: port over which the trace request arrived
Outgoing Port: port over which trace request is forwarded (or 0xffffffffffff) if sent over all outgoing ports
Incoming Port Frame Count: number of frames (multicast or unicast, as appropriate) received on the trace incoming port
Outgoing Port Frame Count: number of frames (multicast or unicast, as appropriate) sent on the trace outgoing port (or 0xffffffffffff if trace sent over all outgoing ports)
Error Code
Option (type, length, value)

The foregoing description of embodiments of the invention has been presented for purposes of illustration and description. It is not intended to be exhaustive or to limit the invention to the precise forms disclosed. It is intended that the scope of the invention be defined by the following claims and their equivalents.

What is claimed is:

1. In a computer network, a method of troubleshooting a path that includes a source node, a set of destination nodes, and a set of at least an intermediate node, the method comprising:

the source node sending a packet to an intermediate node in the set of at least an intermediate node;

at least a layer-2 intermediate node in the set of at least an intermediate node inserting data into the packet, wherein the data includes a number corresponding to a time at which the packet traversed through the layer-2 intermediate node; and the layer-2 intermediate node sending the packet to a set of at least another node according to information on the intermediate node regarding the path.

2. The method of claim 1, wherein the information on the intermediate node regarding the path is incorrect.

3. The method of claim 1 wherein the data includes an identifier of the layer-2 intermediate node.

4. The method of claim 1, wherein the data includes a medium access control (MAC) address of the layer-2 intermediate node.

5. The method of claim 1, wherein the packet has a layer-2 payload that includes an address corresponding to a node in the set of destination nodes.

6. The method of claim 5, wherein the address corresponding to a node in the set of destination nodes includes a logical link control address assigned to a bridge spanning tree protocol.

7. The method of claim 5, wherein the address corresponding to a node in the set of destination nodes includes a MAC address.

8. The method of claim 7, wherein the MAC address includes a unicast address.

9. The method of claim 7, wherein the MAC address includes a multicast address.

10. The method of claim 1, including:
intermediate nodes in the set of at least an intermediate node sending the packet to respective intermediate nodes or a node in the set of destination nodes according to a spanning tree algorithm.

11. The method of claim 1, wherein the another node includes a node in the set of destination nodes.

12. The method of claim 1, wherein the another node includes a node in the set of at least an intermediate node.

13. The method of claim 1, including:
at least a node from among nodes in the set of destination nodes and nodes in the set of at least an intermediate node sending a second message to a third node, the second message including at least a portion of the data.

14. The method of claim 1, including:
at least a node from among nodes in the set of destination nodes and nodes in the set of at least an intermediate node sending a second message to a third node that was designated in a message sent to the source node, the second message including at least a portion of the data.

15. The method of claim 14, wherein the third node includes a network management station.

16. The method of claim 1, including:
if a message is not received from a node in the set of destination nodes in response to the packet, sending a second packet to an intermediate node in the set of at least an intermediate node, the second packet to cause intermediate nodes in the set of at least an intermediate node to insert their respective identifiers in the packet and at least an intermediate node to send a message including the respective identifiers to a third node.

17. The method of claim 16, wherein the third node comprises a network management node.

18. The method of claim 1, including:
intermediate nodes in the set of at least an intermediate node inserting their respective identifiers in the packet after the respective intermediate nodes receive the packet.

19. The method of claim 1, including:
intermediate nodes in the set of at least an intermediate node inserting their respective identifiers in the packet and sending messages including the identifiers inserted in the packet to a third node.

20. The method of claim 19, wherein the third node comprises a network management node.

21. The method of claim 20, wherein the third node comprises a node designated in a message sent to the source node.

22. The method of claim 1, including: determining a topology based on the packet.

23. The method of claim 1, including: displaying a graphical representation of a topology based on the packet.

24. The method of claim 1, including: based on the packet, determining a maximum transfer unit (MTU) of the path.

25. The method of claim 1, including: based on the packet, identifying a virtual local area network (VLAN).

26. The method of claim 1, wherein the computer network comprises a LAN.

27. The method of claim 1, wherein the computer network comprises a network that implements an IEEE 802.x protocol.

28. The method of claim 1, wherein the computer network comprises a network that implements an IEEE 802.2 protocol.

29. The method of claim 1, wherein the computer network comprises a network that implements an IEEE 802.3 protocol.

30. The method of claim 1, wherein the set of at least an intermediate node includes a bridge.

31. The method of claim 1, wherein the set of at least one intermediate node includes a router.

32. A node in a computer network, wherein the node receives a packet for troubleshooting a path in the computer network, wherein the node is in the path including a source node, a destination node, and a set of at least one intermediate node, and wherein the packet comprises an address that corresponds to the destination node, and further comprises data inserted by layer-2 intermediate nodes through which the packet has traversed, wherein the data includes a number corresponding to a time at which the packet has traversed though each of the set of at least one intermediate node.

33. The node of claim 32, wherein the address includes a unicast address.

34. The node of claim 33, wherein the address includes a medium access control (MAC) address.

35. The node of claim 32, wherein the address includes a multicast address.

36. The node of claim 35, wherein the address includes a medium access control (MAC) address.

37. The node of claim 32, wherein the packet is addressed directly to a next node in the path and a layer-2 payload of the packet includes the layer-2 address that corresponds to the destination node.

38. The node of claim 32, wherein the data includes an identifier of an intermediate node through which the packet has traversed.

39. The node of claim 38, wherein the data includes an address of an intermediate node through which the packet has traversed.

40. The node of claim 32, wherein the data includes a number corresponding to a port of an intermediate node through which the packet has traversed.

41. The node of claim 32, wherein the data includes identifiers of all intermediate nodes through which the packet has traversed.

42. A method of troubleshooting a path that includes a set of layer-2 devices and a set of layer-3 devices, the method comprising:
initiating a first trace to cause at least a layer-3 device in the set of layer-3 devices to insert data into a first packet; and
based on the first trace, initiating a second trace to cause at least a layer-2 device in the set of layer-2 devices to insert data into a second packet.

43. The method of claim 42, including the first trace failing to cause a layer-3 device in the set of layer-3 devices to insert data into the first packet.

44. The method of claim 42, including:
based on the first trace, selecting a second path included in the path, the second path including a source node and a destination node; and initiating the second trace on the second path.

45. The method of claim 42, including causing the first packet to be sent from a destination node in the path.

46. The method of claim 42, including causing the first packet to be sent to a source node in the path.

47. The method of claim 42, including causing the second packet to be sent from a source node in a second path.

48. The method of claim 42, including causing the second packet to be sent to a destination node in a second path.

49. A node in a computer network, wherein the node comprises layer-2 logic, wherein the node is in a path that includes a source node and a destination node, and wherein the node:
receives a packet; and
if the packet includes an indicator that a trace is to be performed, the node inserts data into the packet and sends the packet to another node in the path, wherein the data comprises a number corresponding to a time at which the packet is sent from the node.

50. The node of claim 49, wherein the data comprises an identifier of the node.

51. The node of claim 49, wherein the data comprises an address of the node.

52. The node of claim 49, wherein the data comprises a number corresponding to a port of the node, the port at which the packet is received.

53. The node of claim 49, wherein the data comprises a number corresponding to a port of the node, the port from which the packet is sent.

54. The node of claim 49, wherein the data comprises a number corresponding to a time at which the packet is sent from the node.

55. The node of claim 49, wherein the node sends a message to a second node.

56. The node of claim 49, wherein the node sends a message to a second node designated in the packet.

57. The node of claim 49, wherein the node sends a message to a second node, and wherein the message comprises numbers corresponding to nodes through which the packet has traversed.

58. The node of claim 57, wherein the second node comprises a network management node.

59. The node of claim 49, wherein the indicator comprises a bit.

* * * * *